United States Patent [19] [11] 4,412,948
Omura et al. [45] Nov. 1, 1983

[54] REACTIVE DISAZO BLUE DYE

[75] Inventors: Takashi Omura, Ashiya; Yasuo Tezuka, Ibaraki; Masaki Sunami, Toyonaka, all of Japan

[73] Assignee: Sumitomo Chemical Company, Limited, Osaka, Japan

[21] Appl. No.: 164,243

[22] Filed: Jun. 30, 1980

[30] Foreign Application Priority Data

Jul. 6, 1979 [JP] Japan .................................. 54-86349

[51] Int. Cl.³ ............................................ C09B 31/047
[52] U.S. Cl. .................................................... 260/153
[58] Field of Search ......................................... 260/153

[56] References Cited

U.S. PATENT DOCUMENTS 3,223,470 12/1965 Boedeker et al. ............. 260/160 X
3,711,460 1/1973 Schundehutte ................. 260/153 X

FOREIGN PATENT DOCUMENTS 617323 7/1962 Belgium .
2084024 12/1971 France ................. 260/153
2437426 4/1980 France ................. 260/153
410237 10/1966 Switzerland ........... 260/153
961078 6/1964 United Kingdom ....... 260/153
2026527 2/1980 United Kingdom ....... 260/153

OTHER PUBLICATIONS

*Chemical Abstracts,* vol. 58, Abstract No. 12712(e), Farbwerke Hoechst, "Washfast Dyes for Textiles".

*Primary Examiner*—Thomas A. Waltz
*Assistant Examiner*—B. J. Boggs, Jr.
*Attorney, Agent, or Firm*—Stevens, Davis, Miller & Mosher

[57] ABSTRACT

A bisazo reactive dye represented by a free acid of the formula,

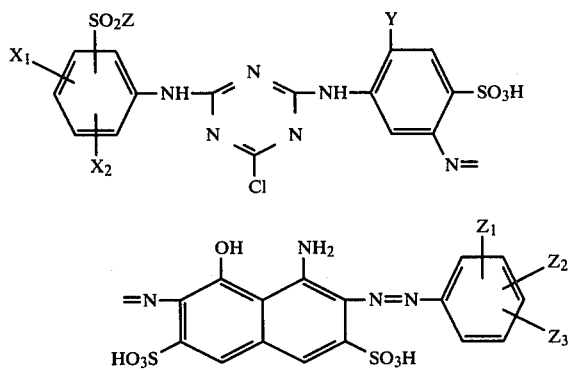

wherein $X_1$ and $X_2$ are each a hydrogen atom, a methyl or methoxy group, a chlorine atom, or a carboxylic acid or sulfonic acid group, Y is a hydrogen atom, a methyl or sulfonic acid group, Z is $-CH_2CH_2OSO_3H$, $-CH_2CH_2OPO_3H_2$, $-CH_2CH_2Cl$ or $-CH=CH_2$, and $Z_1$, $Z_2$ and $Z_3$ are each a hydrogen or chlorine atom, a methyl, methoxy, sulfonic acid or carboxylic acid group. This dye is usable for dyeing cellulose fibers in a deep blue color with good fastnesses, particularly, chlorine, light and perspiration-light fastnesses, a high acid stability, good white dischargeability as well as level dyeing properties.

4 Claims, No Drawings

REACTIVE DISAZO BLUE DYE

The present invention relates to a novel reactive disazo dye suitable for dyeing cellulose fiber materials in a deep blue color.

It is already well known that water-soluble dyes obtainable by coupling 2 moles of a benzene or naphthalene series diazonium compound with 1 mole of a 1-amino-8-naphtholsulfonic acid can dye fiber materials green to blue. Of these dyes, those having a monohalogenotriazinyl group are well known as reactive dyes. Generally, however, these reactive dyes require high dyeing temperatures, and are hardly suitably for exhaustion dyeing, so that they are only used for printing. Besides, these dyes produce dyed materials of a poor acid stability so that they are never said to be satisfactory in practical use. For example, a monochlorotriazinyl type reactive dye of the formula,

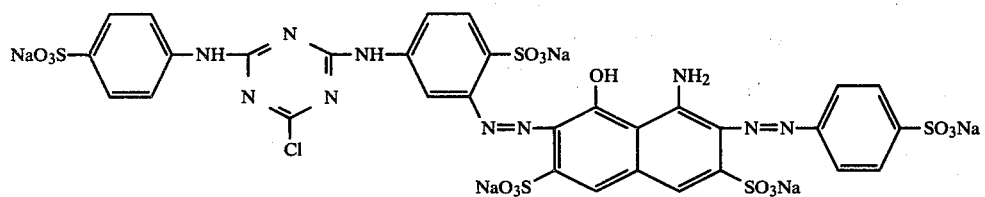

is disclosed in British Pat. No. 961,078. However, the acid stability of materials dyed with this dye is insufficient, and requires high dyeing temperatures and thus is not suitable for exhaustion dyeing. Consequently when these dyes are used for dip dyeing, they cannot produce a desired color density.

It is also well known that dyes having a β-sulfatoethylsulfonyl group are used for dyeing fiber materials as the so-called vinylsulfonyl type reactive dyes. Generally, however, materials dyed with azo deep blue reactive dyes having a β-sulfatoethylsulfonyl group are so poor in chlorine fastness that the materials often discolor by the action of chlorine present in city water.

For the reasons as described above, the inventors extensively studied to find a deep blue reactive dye having a particularly superior chlorine fastness, a high acid stability, and in addition good light fastness and perspiration-light fastness. As a result, it was found that disazo dyes having both a vinylsulfonyl type group and a monochlorotriazinyl group as reactive groups can produce deep blue dyeings meeting these requirements.

The present invention provides a compound represented by a free acid of the formula (I),

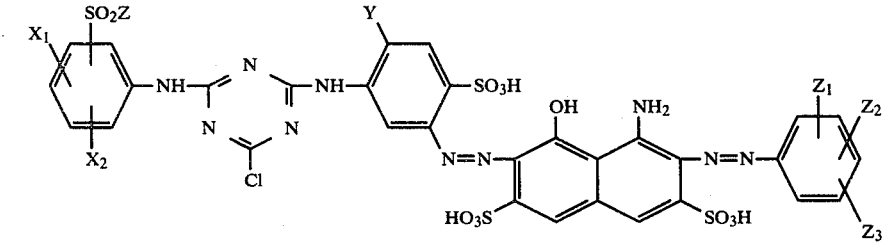

wherein $X_1$ and $X_2$ are each a hydrogen atom, a methyl or methoxy group, a chlorine atom, or a carboxylic acid or sulfonic acid group, Y is a hydrogen atom, a methyl or sulfonic acid group, Z is $-CH_2CH_2OSO_3H$, $-CH_2CH_2OPO_3H_2$, $-CH_2CH_2Cl$ or $-CH=CH_2$, and $Z_1$, $Z_2$ and $Z_3$ are each a hydrogen or chlorine atom, a methyl, methoxy, sulfonic acid or carboxylic acid group, and a process for producing the compound of the formula (I), which comprises (1) reacting 1-amino-8-hydroxynaphthalene-3,6-disulfonic acid with a diazotized compound of the formula (II),

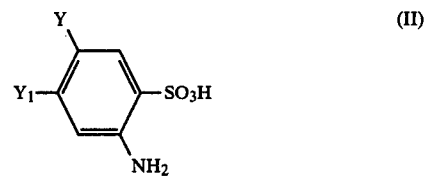

wherein $Y_1$ is an amino, acetylamino or nitro group, and Y is as defined above, a diazotized aniline compound of the formula (III),

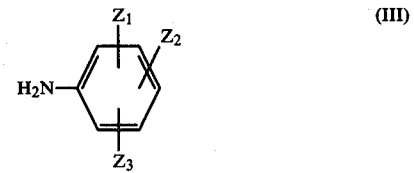

wherein $Z_1$, $Z_2$ and $Z_3$ are as defined above, 2,4,6-trichloro-s-triazine, and an amino compound of the formula (IV),

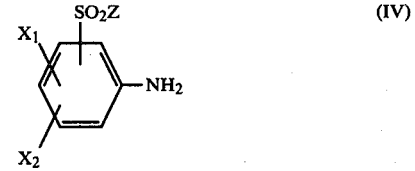

wherein $X_1$, $X_2$ and Z are as defined above, in an optional order, (2) reacting 1-amino-8-hydroxynaphthalene-3,6-disulfonic acid with the diazotized compound of the formula (II) and the diazotized aniline compound of the formula (III), if necessary followed by reduction or hydrolysis, to obtain an intermediate disazo compound of the formula (V),

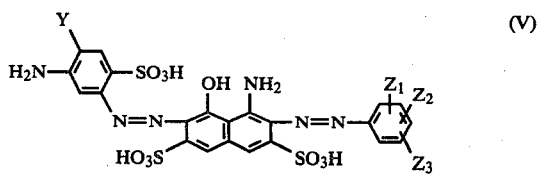

wherein Y, $Z_1$, $Z_2$ and $Z_3$ are as defined above, and reacting the disazo compound of the formula (V) with 2,4,6-trichloro-s-triazine and the amino compound of the formula (IV) in an optional order, (3) reacting a diazotized compound produced by condensation of the compound of the formula (II) having an amino group as $Y_1$ and 2,4,6-trichloro-s-triazine, followed by diazotization with a monoazo compound which is represented by the formula (VI),

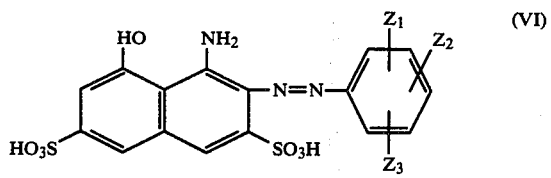

wherein $Z_1$, $Z_2$ and $Z_3$ are as defined above, and which is produced by reacting 1-amino-8-hydroxynaphthalene-3,6-disulfonic acid with the diazotized aniline compound of the formula (III) under an acidic condition, to obtain a triazinyl disazo compound of the formula (VII),

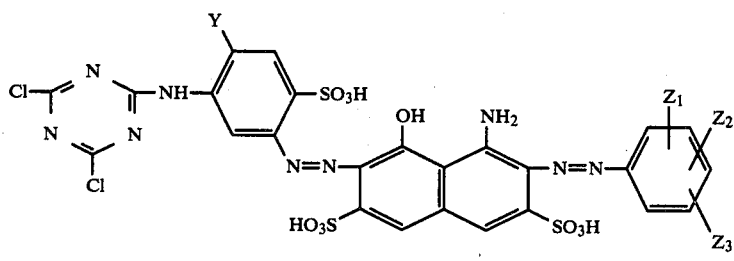

wherein Y, $Z_1$, $Z_2$ and $Z_3$ are as defined above, and then reacting the triazinyl disazo compound of the formula (VII) with the amino compound of the formula (IV), or (4) reacting a diazotized compound, which is represented by the formula (VIII),

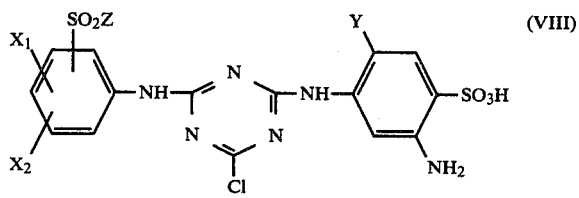

wherein $X_1$, $X_2$, Y and Z are as defined above, and which is produced by reacting the compound of the formula (II), having an amino group as $Y_1$, the amino compound of the formula (IV) and 2,4,6-trichloro-s-triazine in an optional order, followed by diazotization, with the monoazo compound of the formula (VI).

Of the compounds of the formula (I), preferred are those having —$CH_2CH_2OSO_3H$ or —$CH{=}CH_2$, particularly —$CH_2CH_2OSO_3H$, as Z in the formula (I), and those obtainable using aniline monosulfonic acid, particularly aniline-4-sulfonic acid as the aniline compound of the formula (III) in terms of color, build-up property and chlorine fastness.

In carrying out the present invention, the compound (II) usable in the present process includes 1,3-diaminobenzene-4-sulfonic acid, 1,3-diaminobenzene-4,6-disulfonic acid, 2,4-diaminotoluene-5-sulfonic acid, 5-acethylaminoaniline-2-sulfonic acid and 5-nitroaniline-2-sulfonic acid. Of these, 1,3-diaminobenzene-4-sulfonic acid is preferred.

Examples of the aniline compound (III) usable in the present invention, are aniline, aniline-2-, -3- or -4-sulfonic acid, aniline-2,5-disulfonic acid, anthranilic acid, p-toluidine-o-sulfonic acid, 3-amino-6-chlorotoluene-4-sulfonic acid, 2-chloro-p-toluidine-5-sulfonic acid, p-anisidine-o-sulfonic acid and 2-, 3- or 4-chloroaniline. Of these, the preferred is aniline -2, -3 or -4-sulfonic acid.

Examples of the amino compound (IV), are 1-aminobenzene-3- or -4-β-sulfatoethylsulfone, 1-amino-2-methoxybenzene-5-β-sulfatoethylsulfone, 1-amino-4-methoxybenzene-3-β-sulfatoethylsulfone, 1-amino-2-methoxy-5-methylbenzene-4-β-sulfatoethylsulfone, 1-amino-2-sulfobenzene-4-β-sulfatoethylsulfone, 1-amino-2-sulfobenzene-5-β-sulfatoethylsulfone, 1-amino-2-carboxybenzene-4-β-sulfatoethylsulfone, 1-amino-2-chlorobenzene-4-β-sulfatoethylsulfone, 1-aminobenzene-3- or -4-β-vinylsulfone, 1-aminobenzene-3- or -4-β-phosphatoethylsulfone, 1-aminobenzene-3- or -4-β-chloroethylsulfone and 1-amino-2-sulfobenzene-4- or -5-β-vinylsulfone. Of these, the preferred is 1-aminobenzene-3- or -4-β-sulfatoethylsulfone.

The dyes of the present invention can be produced by several methods, for example, by reacting 1-amino-8-hydroxynaphthalene-3,6-disulfonic acid with a diazotized compond of the formula (II), a diazotized aniline compound of the formula (III), 2,4,6-trichloro-s-triazine, and an amino compound of the formula (IV) in an optional order.

Preferably in the first step 1-amino-8-hydroxynaphthalene-3,6-disulfonic acid is coupled with a diazotized aniline compound of the formula (III) at −5° to 30° C. in an aqueous acidic medium, particularly at the pH of 0 to 3 under stirring for 1 to 10 hours, if necessary adding a coupling accelerator and/or a surfactant, to obtain a monoazo compound of the formula (VI), which may be isolated by salting out and filtration prior to the subsequent reaction.

A monochlorotriazynyl group and/or a vinylsulfonyl type group as reactive groups can be introduced to a dye intermediate at the initial or the final step. Introducing at the final step, takes place as follows an intermediate disazo compound of the formula (V), which is obtained by coupling the monoazo compound of the formula (VI) with the diazotized compound of the formula (II) at 0° to 30° C. in an aqueous medium, particularly at the pH of 3 to 10 under stirring for 1 to 5 hours, and then reducing to an amino group at 20° to 80° C. by sodium sulfide or sodium bisulfide in case of using a nitro group-containing compound as the compound of the formula (II), or hydrolyzing to an amino group at 60° C. to 100° C. in 1 to 10% sodium hydroxide solution in case of using an acethylamino group-containing compound as the compound of the formula (II), is reacted with 2,4,6-trichloro-s-traizine and the amino compound of the formula (IV) in an optional order to obtain a dye at the present invention. In this case the first condensation can be carried out at −10° to 30° C. adjusting the pH at the solution to 1 to 9 and the second condensation can be carried out at 0° to 40° C. adjusting the pH of the solution to 2 to 9 by using an acid binding agent such as sodium hydroxide, sodium carbonate or sodium hydrogen carbonate.

Introducing at the initial step, takes place as follows 2,4,6-trichloro-s-triazine is condensed with the compounds of the formula (II) having amino group as $Y_1$ in the same condition mentioned above, then diazotized, and coupled with the monoazo compound of the formula (VI) at 0° to 30° C. at the pH of 3 to 10 for 1 to 5 hours, finally condensed with the amino compound of the formula (IV) at 0° to 40° C. at the pH of 2 to 9 for 1 to 10 hours, to obtain a dye of the present invention.

In another method, 2,4,6-trichloro-s-triazine is condensed with the amino compound of the formula (IV) and the compounds of the formula (II), if necessary followed by reduction or hydrolysis in an optional order, to obtain a compound of the formula (VIII). Preferably 2,4,6-trichloro-s-triazine is condensed primarily with the compounds at the formula (II) having an amino group as $Y_1$ at −10° to 30° C. adjusting the pH of the solution of 1 to 9 and then condensed secondarily with the amino compound of the formula (IV) at 0° to 40° C. at the pH of 2 to 9. Subsequently a diazotized compound of the formula (VIII) is coupled with the monoazo compound of the formula (VI) at 0° to 30° C. at the pH of 3 to 10, to obtain a dye of the present invention.

The thus obtained compound can be used for dyeing cellulose fiber materials deep blue in a conventional dyeing method such as exhaustion dyeing, printing and cold batch up dyeing.

Examples of the cellulose fiber materials to be dyed in accordance with the present invention are natural or regenerated cellulosic fibers such as cotton, flax, viscose rayon, viscose staple fiber, and the like.

Exhaustion dyeing can be carried out at a relatively low temperature in the presence of an acid-binding agent (e.g. sodium carbonate, trisodium phosphate, sodium hydroxide) using a dyeing bath containing sodium sulfate or sodium chloride.

Further, the dyes of this invention are capable of level dyeings can be used in a wide range of dyeing temperature and are minimized in effect by dyeing temperatures, the kind of an acid-binding agent used, the amount of inorganic salt used and bath ratio, hence they have good color reproducibility. When the printing process is applied to the dyeing of the present invention, the dyes of the present invention are applied to fibers together with a thickening agent (e.g. sodium alginate, starch ether) or emulsified product of the agent, an alkali agent (e.g. sodium carbonate, sodium hydrogen carbonate, sodium hydroxide, trisodium phosphate, sodium trichloroacetate, corresponding potassium or alkaline earth metal compounds) or alkali-releasing agent, and if necessary a common printing assistant (e.g. urea) or a dispersing agent, followed by drying and heat treatment particularly in the presence of steam.

The dyes of the present invention can give a dyed product superior particularly in chlorine fastness, light fastness and perspiration-light fastness to the conventional azo deep blue reactive dyes having a $\beta$-sulfatoethylsulfonyl group. Particularly, considering that the use of chlorine bleaching agent has recently become popular in washing at home, the dyes of the present invention having a superior chlorine fastness may be said to be of a high value. Further, the present dyes of superior light fastness and perspiration-light fastness are suitable for dyeing outdoor wear such as sports wear. Also, the dyes of the present invention have a high exhaustion and fixing percentage in exhaustion dyeing, so that colors of a deep have can be obtained.

They are also distinguished by their excellent wash-off properties, easy removability of the unfixed dye and they leave a very limited dye quantity of residual dye in the bath, which indicates that the dyes of this invention have an advantage in respect of waste water treatment, as well.

Moreover, they are distinguished by their good white dischargeability.

The textile materials dyed with conventional reactive dyes with mono- or dichlorotriazinyl groups would be affected by acidic gas or other matters in the air and lowered in color fastness with the lapse of time, but the dyes of this invention have eliminated such problems, too.

The method of the present invention will be illustrated with reference to the following examples, which are not intended to limit the scope of the present invention. All parts in the examples are by weight, and the acid stability was tested as follows: A dyed cloth is dipped in a 1% aqueous acetic acid solution for 30 minutes and treated at 37±2° C. for 6 hours at a pressure of 125 g/cm$^2$ using a perspirometer.

EXAMPLE 1

Aniline-4-sulfonic acid (4.33 parts) and conc. hydrochloric acid (3.7 parts) were added to ice water (25 parts), and a 35% aqueous sodium nitrite solution (5.1 parts) was added thereto at 0° to 5° C. to carry out diazotization. After removing an excess of the nitrite, a neutral solution containing 1-amino-8-hydroxynaphthalene-3,6-disulfonic monosodium salt (7.81 parts) was added to the diazo liquor at 0° to 10° C. over about 1 hour to carry out coupling while keeping the pH of the liquor at 0.5 to 1.5. This reaction mixture was stirred for several hours, neutralized to a pH of 7 with a sodium hydroxide solution and then salted out with sodium chloride to obtain a monoazo dye.

Separately from this, condensation between cyanuric chloride (4.61 parts) and m-phenylenediaminesulfonic acid (4.70 parts) was carried out at 0° to 5° C. for 1 to 2 hours in an aqueous surfactant solution while keeping the pH of the solution at 6 to 7. Thereafter, second condensation was carried out by adding 1-aminobenzene-3-$\beta$-sulfatoethylsulfone (6.95 parts) to the above reaction solution and containing stirring overnight at 25° to 30° C. while keeping the pH of the solution at 5 to 5.5 with a 9% aqueous sodium hydrogen carbonate solution.

After adding ice (50 parts) and conc. hydrochloric acid (7.1 parts) to the above reaction solution, a 35% aqueous sodium nitrite solution (5.3 parts) was added thereto to carry out diazotization. After removing an excess of the nitrite, the diazo liquor was added at 5° to 10° C. to a suspension of the foregoing monoazo dye made alkaline with sodium hydrogen carbonate. The mixture was stirred for 1 to 2 hours to complete coupling reaction. Thereafter, the reaction solution was adjusted to a pH of 5.5 to 6.0 with a dilute sulfuric acid, heated to 50° to 55° C. and then salted out with sodium chloride to obtain precipitates which were then filtered, washed and dried at 60° C. to obtain 35.4 parts of the dye (1).

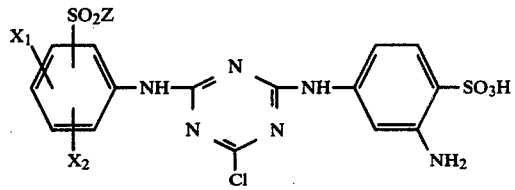

D column: $\lambda_{max}$ of a dis-azo dye solution

TABLE (1)

| No. | A (Azo component) | B Formula (III) | C Formula (IV) | D H₂O $\lambda_{max}$ (nm) |
|---|---|---|---|---|
| (2) | 1-Amino-8-hydroxy-naphthalene-3,6-disulfonic acid | Aniline-2-sulfonic acid | 1-Aminobenzene-3-β-sulfatoethylsulfone | 603 |
| (3) | 1-Amino-8-hydroxy-naphthalene-3,6-disulfonic acid | Aniline-3-sulfonic acid | 1-Aminobenzene-3-β-sulfatoethylsulfone | 596 |
| (4) | 1-Amino-8-hydroxy-naphthalene-3,6-disulfonic acid | Aniline-4-sulfonic acid | 1-Aminobenzene-4-β-sulfatoethylsulfone | 600 |
| (5) | 1-Amino-8-hydroxy-naphthalene-3,6-disulfonic acid | Aniline-4-sulfonic acid | 1-Amino-2-methoxybenzene-5-β-sulfatoethylsulfone | 600 |
| (6) | 1-Amino-8-hydroxy-naphthalene-3,6-disulfonic acid | Aniline-4-sulfonic acid | 1-Amino-4-methoxybenzene-3-β-sulfatoethylsulfone | 600 |

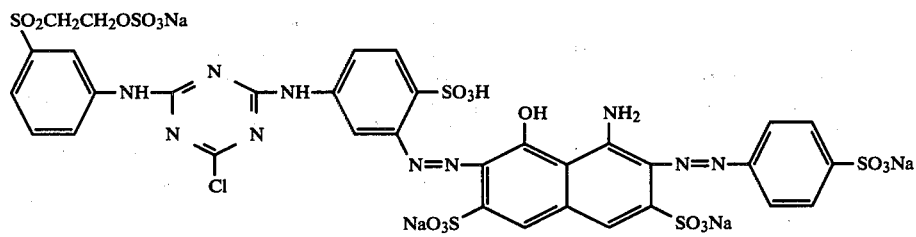

(1)

[$\lambda_{max}$=600 nm (measured in a water medium); $\lambda_{max}$ was measured in the same condition hereinafter]

EXAMPLES 2 TO 6

In a manner similar to that of Example 1, each dye was prepared using the reactants as shown in the following table (1).

These dyes are characterized by the components described in A, B and C columns and $\lambda_{max}$ described in D column.

A column: azo component
B column: diazo component [compound of the formula (III)] of a monoazo dye
C column: aniline compound [compound of the formula (IV)] constituting the diazo component of a dis-azo dye:

EXAMPLE 7

Condensation between cyanuric chloride (4.61 parts) and m-phenylenediaminesulfonic acid (4.70 parts) was carried out at 0° to 5° C. for 1 to 2 hours in an aqueous surfactant solution while keeping the pH of the solution at 1.5 to 3.5.

After adding ice (50 parts) and conc. hydrochloric acid (7.1 parts) to the above reaction solution, a 35% aqueous sodium nitrite solution (5.3 parts) was added thereto to carry out diazotization. After removing an excess of the nitrite, 1-amino-8-hydroxy-2-(p-sulfophenylazo)naphthalene-3,6-disulfonic acid synthesized in the same manner as in Example 1 except adding urea as a coupling accelerator was added to the above diazo liquor at 5° to 10° C. The mixture was stirred for 1 to 2 hours to complete coupling reaction while keeping the pH of the solution at 6 to 7. Then, second condensation was carried out by adding 1-aminobenzene-3-β-sulfatoethylsulfone (6.95 g) to the above reaction solution and continuing stirring overnight at 5° to 30° C. while keeping the pH of the solution at 4 to 7 with a 20% aqueous sodium carbonate solution. Thereafter, the reaction solution was adjusted to a pH of 4.0 to 4.5 with a dilute sulfuric acid, heated to 55° to 60° C. and salted out with sodium chloride to obtain precipitates which were then filtered, washed and dried at 60° C. to obtain 38.2 parts of the dye (1).

EXAMPLES 8 TO 13

The following dyes in the table (2) were synthesized in the same manner as in Example 7 except that the aniline compounds of the formula (IV) in the table (2) were used in place of 1-aminobenzene-3-β-sulfatoethylsulfone.

TABLE (2)

| No | formula (IV) |
|---|---|
| 8 | 1-aminobenzene-3-β-phosphatoethylsulfone |
| 9 | 1-aminobenzene-3-β-vinylsulfone |
| 10 | 1-aminobenzene-3-β-chloroethylsulfone |
| 11 | 1-amino-2-sulfobenzene-4-β-vinylsulfone |
| 12 | 1-amino-2-sulfobenzene-5-β-vinylsulfone |
| 13 | 1-aminobenzene-4-β-vinylsulfone |

EXAMPLE 14

5-ethylaminoaniline-2-sulfonic acid (5.75 parts) and conc. hydrochloric acid (3.7 parts) were added to ice water (25 parts), and a 35% aqueous sodium-nitrite solution (5.1 parts) was added thereto at 0° to 5° C. to carry out diazotization. After removing an excess of the nitrite, a neutral solution containing 1-amino-8-hydroxy-2-(m-sulfophenylazo)naphthalene-3,6-disulfonic trisodium salts synthesized in the same manner as in Example 1 was added to the above diazo liquor at 0° to 10° C. over about 1 hour to carry out coupling while keeping the pH at the liquor at 6 to 7. Sodium hydroxide in an amount of 5% of the volume of the reaction mixture was added thereto, and the mixture was heated to 90° to 95° C. for 5 to 10 hours to perform hydrolysis, thereafter, adjusted to a pH of 5 to 6, and then salted out with sodium chloride at 50° to 60° C. to obtain precipitates which were then filtered and washed to obtain the dye intermediate.

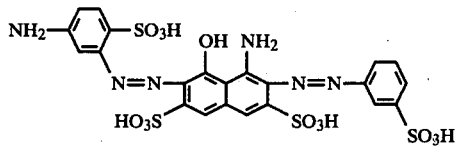

Condensation between cyanuric chloride and the above dye intermediate was carried out at 5° to 30° C. for 2 to 5 hours in an aqueous surfactant solution while keeping the pH of the solution at 5 to 7. Thereafter second condensation with 1-aminobenzene-3-β-sulfatoethylsulfone was carried out in the same manner as in Example 7, to obtain 33.6 parts of the dye (3).

EXAMPLES 15 TO 37

In a manner similar to that of Example 14, each dye was prepared using the reactants as shown in the following table (3).

These dyes are characterized by the components described in A, B and C columns and $\lambda_{max}$ described in D column.

A column: azo component
B column: diazo component [compond of the formula (III)] of a monoazo dye
C column: aniline compound [compound of the formula (IV)] constituting the diazo component of a dis-azo dye:

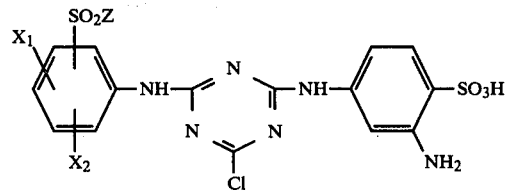

D column: $\lambda_{max}$ of a dis-azo dye solution

TABLE (3)

| No. | A (Azo component) | B Formula (III) | C Formula (IV) | D H$_2$O $\lambda_{max}$ (nm) |
|---|---|---|---|---|
| (15) | 1-Amino-8-hydroxy-naphthalene-3,6-disulfonic acid | Anthranilic acid | 1-Amino-2-methoxy-5-methyl-benzene-4-β-sulfatoethyl-sulfone | 610 |
| (16) | 1-Amino-8-hydroxy-naphthalene-3,6-disulfonic acid | 3-Amino-6-chlorotoluene-4-sulfonic acid | 1-Aminobenzene-3-β-sulfato-ethylsulfone | 607 |
| (17) | 1-Amino-8-hydroxy-naphthalene-3,6-disulfonic acid | 2-Chloro-p-toluidine-5-sulfonic acid | 1-Aminobenzene-3-β-sulfato-ethylsulfone | 612 |
| (18) | 1-Amino-8-hydroxy-naphthalene-3,6-disulfonic acid | p-Toluidine-sulfonic acid | 1-Aminobenzene-3-β-sulfato-ethylsulfone | 605 |
| (19) | 1-Amino-8-hydroxy-naphthalene-3,6-disulfonic acid | 3-Chloro-aniline | 1-Aminobenzene-3-β-sulfato-ethylsulfone | 600 |
| (20) | 1-Amino-8-hydroxy-naphthalene-3,6-disulfonic acid | 4-Chloro-aniline | 1-Aminobenzene-3-β-sulfato-ethylsulfone | 596 |
| (21) | 1-Amino-8-hydroxy-naphthalene-3,6-disulfonic acid | 4-Chloro-aniline | 1-Amino-2-sulfobenzene-4-β-sulfatoethylsulfone | 596 |
| (22) | 1-Amino-8-hydroxy-naphthalene-3,6-disulfonic acid | 3-Chloro-aniline | 1-Amino-2-sulfobenzene-5-β-sulfatoethylsulfone | 600 |
| (23) | 1-Amino-8-hydroxy-naphthalene-3,6-disulfonic acid | 4-Chloro-aniline | 1-Amino-2-carboxybenzene-4-β-sulfatoethylsulfone | 596 |

TABLE (3)-continued

| No. | A (Azo component) | B Formula (III) | C Formula (IV) | D H₂O $\lambda_{max}$ (nm) |
|---|---|---|---|---|
| (24) | 1-Amino-8-hydroxy-naphthalene-3,6-disulfonic acid | Aniline-4-sulfonic acid | 1-Amino-2-chlorobenzene-4-β-sulfatoethylsulfone | 600 |
| (25) | 1-Amino-8-hydroxy-naphthalene-3,6-disulfonic acid | Aniline-2,5-di-sulfonic acid | 1-Aminobenzene-3-β-sulfato-ethylsulfone | 606 |
| (26) | 1-Amino-8-hydroxy-naphthalene-3,6-disulfonic acid | 4-Chloro-aniline | 1-Aminobenzene-4-β-sulfato-ethylsulfone | 596 |
| (27) | 1-Amino-8-hydroxy-naphthalene-3,6-disulfonic acid | 4-Chloro-aniline | 1-Amino-2-methoxybenzene-5-β-sulfatoethylsulfone | 596 |

EXAMPLE 28

A dye represented by the formula (28),

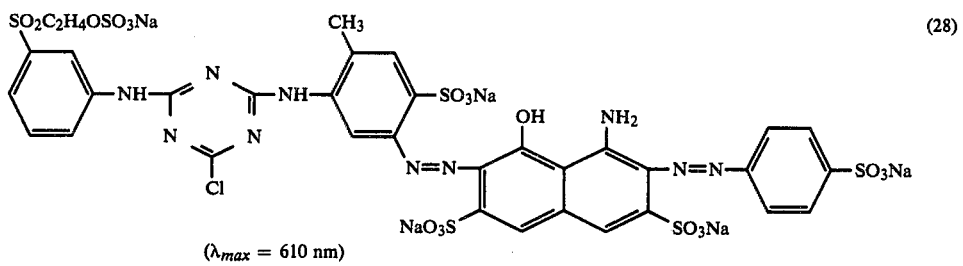

($\lambda_{max}$ = 610 nm)

was synthesized in the same manner as in Example 1 except that m-toluylenediaminesulfonic acid (5.05 parts) was used in place of m-phenylenediaminesulfonic acid (4.70 parts), to obtain 33.9 parts of the dye.

EXAMPLE 29

0.3 part of a dye represented by the formula (1),

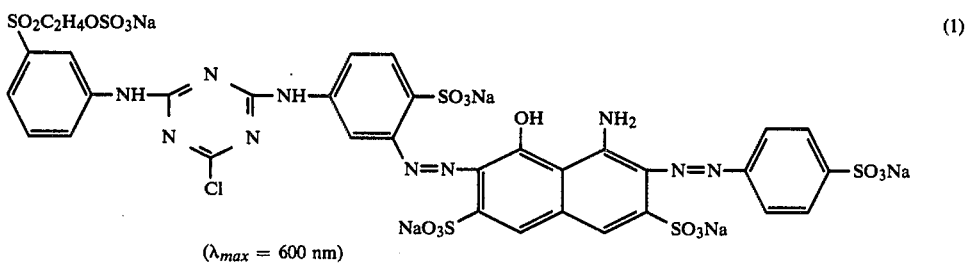

($\lambda_{max}$ = 600 nm)

was dissolved in water (200 parts), and sodium sulfate (20 parts) and cotton (10 parts) were added to the dye liquor which was then heated to 40° C. After 30 minutes passed, sodium carbonate (4 parts) was added, and dyeing was carried out at the same temperature for 1 hour. After dyeing was finished, the dyed cotton was rinsed and soaped to obtain dyeings of a heavily deep blue color having excellent fastnesses to chlorine, light and perspiration-light, good white dischargeability as well as level dyeing properties.

EXAMPLE 30

Dyeing operation was carried out in the same manner as in Example 29 except that the above-mentioned dyes (2) to (27) were used in place of the dye (1). Thus, dyeings of heavily deep blue colors having excellent fastnesses were obtained.

EXAMPLE 31

0.3 Part of a dye represented by the formula (28),

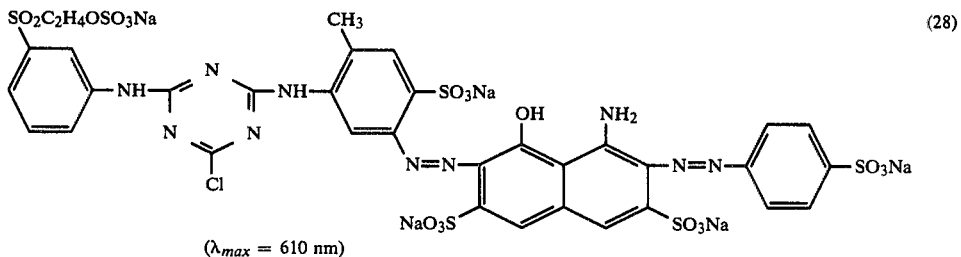

($\lambda_{max}$ = 610 nm)

was dissolved in water (200 parts), and dyeing was carried out at 50° C. for 1 hour. After dyeing was finished, the dyed cotton was rinsed and soaped to obtain deep blue dyeings having excellent fastnesses to chlorine, light and perspiration-light.

In the synthetic method for the dye (28), the components of the dye were changed as follows: 1-aminobenzene-3-β-sulfatoethylsulfone was replaced with 1-aminobenzene-4-β-sulfatoethylsulfone, 1-amino-2-methoxybenzene-5-β-sulfatoethylsulfone and 1-amino-4-methoxy-3-β-sulfatoethylsulfone; and aniline-4-sulfonic acid was replaced with aniline-2- or -3-sulfonic acid and 3- or 4-chloroaniline; and m-toluylenediamine-sulfonic acid was replaced with 1,3-diamino benzene-4,6-disulfonic acid. The dyes thus obtained also produced dyeings having the same performances as above.

COMPARATIVE EXAMPLE 1

The fabrics dyed with the dyes of this invention show a high acid stability (4th to 4–5th grade) (the testing method is mentioned above).

But, the acid stability of materials dyed with the dye of the formula

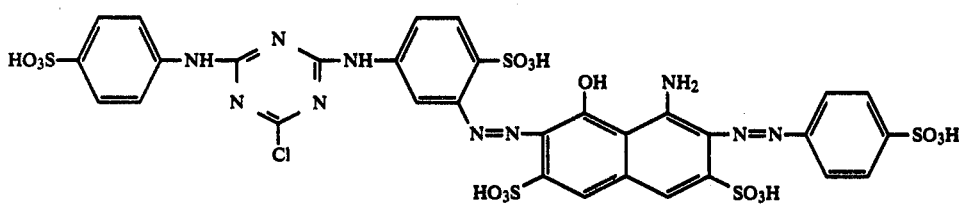

is insufficient. (2nd to 3rd grade)

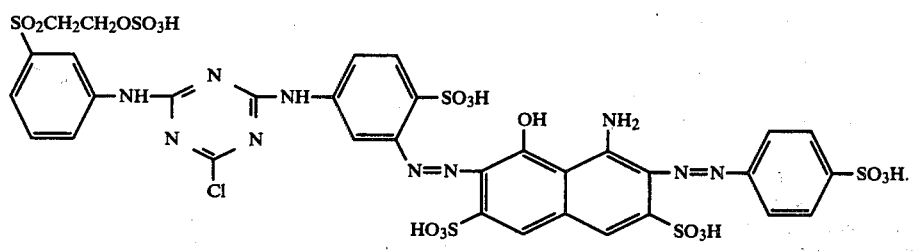

What is claimed is:

1. A compound represented by a free acid of the formula,

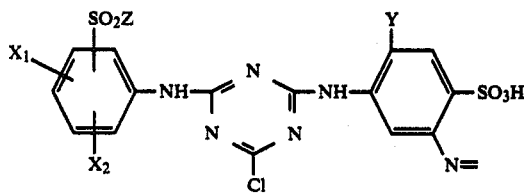

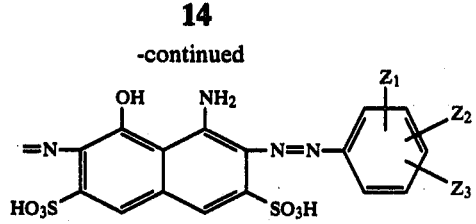

wherein $X_1$ and $X_2$ are each a hydrogen atom, a methyl or methoxy group, a chlorine atom, or a carboxylic acid or sulfonic acid group, Y is a hydrogen atom, a methyl or sulfonic acid group, Z is $-CH_2CH_2OSO_3H$, $-CH_2CH_2OPO_3H_2$, $-CH_2CH_2Cl$ or $-CH=CH_2$, and $Z_1$, $Z_2$ and $Z_3$ are each a hydrogen or chlorine atom, a methyl, methoxy, sulfonic acid or carboxylic acid group.

2. A compound represented by a free acid of the formula,

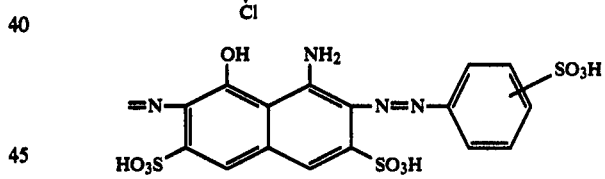

wherein Z is $-CH_2CH_2OSO_3H$, $-CH_2CH_2OPO_3H_2$, $-CH_2CH_2Cl$ or $-CH=CH_2$.

3. A compound represented by a free acid of the formula,

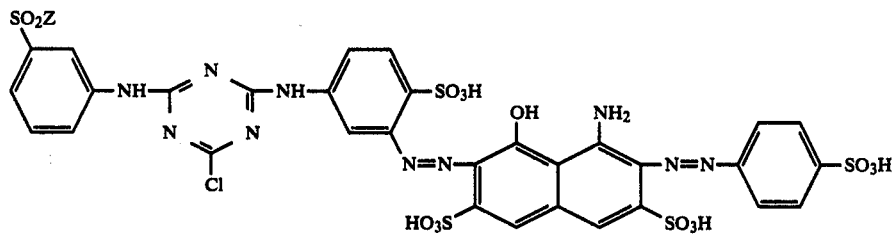

wherein Z is $-CH_2CH_2OSO_3H$, $-CH_2CH_2OPO_3H_2$, $-CH_2CH_2Cl$ or $-CH=CH_2$.

4. A compound represented by a free acid of the formula,